United States Patent [19]

Petrus

[11] 4,040,463
[45] Aug. 9, 1977

[54] FASTENER

[75] Inventor: Stephen Petrus, Parma, Ohio

[73] Assignee: Eaton Corporation, Cleveland, Ohio

[21] Appl. No.: 488,615

[22] Filed: July 12, 1974

[51] Int. Cl.² .................. A47G 29/02; F16D 39/28
[52] U.S. Cl. ................................. 151/41.75; 85/80; 248/239
[58] Field of Search ............... 151/41.75; 85/80, 5 R; 24/73 PM, 73 PF, 73 P; 248/239

[56] References Cited

U.S. PATENT DOCUMENTS 3,212,052  10/1965  Johanson .................. 85/5 R X
3,826,458  7/1974  Fisher ......................... 85/80 X

FOREIGN PATENT DOCUMENTS 246,388  8/1963  Australia ..................... 85/5 R
1,171,270  11/1969  United Kingdom .......... 151/41.75
1,244,271  8/1971  United Kingdom .......... 151/41.75

Primary Examiner—Ramon S. Britts
Attorney, Agent, or Firm—Teagno & Toddy

[57] ABSTRACT

A one-piece, molded fastener for self-retention in an apertured panel. The fastener provides a means for receiving and retaining a mounting member attached from one side of the panel and will seal the aperture from the other side of the panel. The fastener includes a slotted insertion member with a plurality of radially outwardly extending protuberances on one end thereof to self-retainingly engage the apertured panel and to receive said mounting means and a dished head on the other end thereof to engage the side of the panel from which the fastener is inserted and to seal said aperture.

7 Claims, 10 Drawing Figures

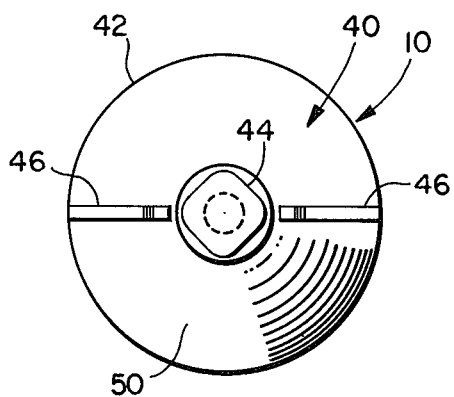
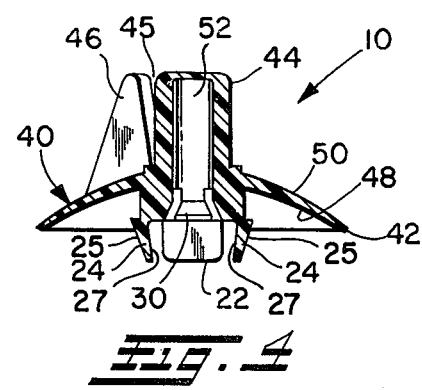
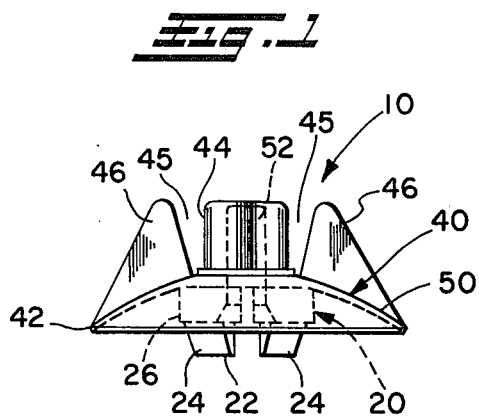
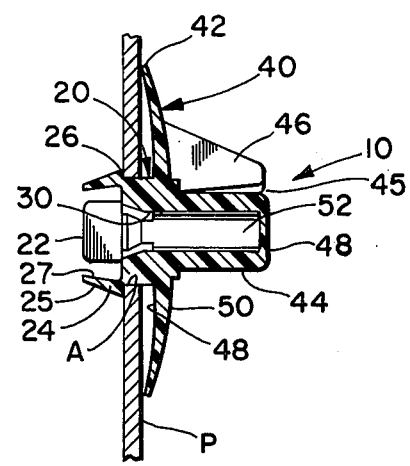
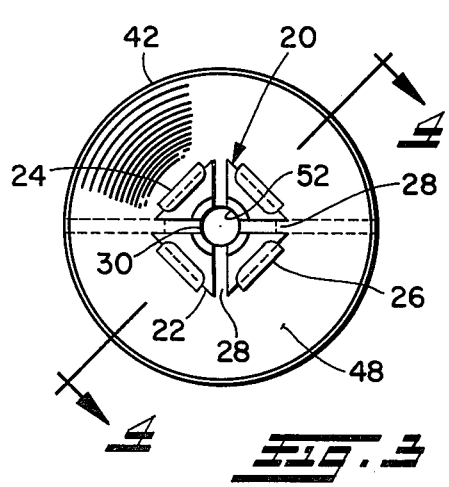
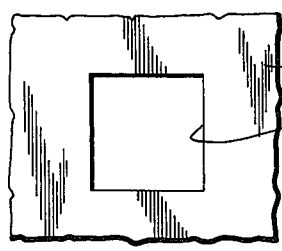

FASTENER

BACKGROUND OF THE INVENTION

1. Field of the Invention

This invention relates to molded fasteners for sealing self-retention in an apertured panel and for providing means to retain a mounting member and more particularly, relates to one-piece, molded fasteners for self-retention in an apertured panel and for providing means to attach a mounting member from one side of the panel while sealing the aperture from the other side of the panel. The fastener is particularly useful in attaching shelf brackets or the like to the front side of the interior liner of an insulated appliance such as a refrigerator or a freezer or the like.

2. Description of the Prior Art

Molded fasteners for attaching brackets or shelves to the interior liners of insulated appliances are known in the prior art and examples thereof may be seen by reference to U.S. Pat. Nos. 1,918,457; 3,378,219; 3,443,783 and 3,621,751. The prior art devices are not totally satisfactory for one or more reasons such as being rather complicated and expensive to produce, requiring specialized, complementary parts for use therewith, not properly sealing the aperture in the liner and/or being difficult to install.

SUMMARY OF THE INVENTION

In accordance with the present invention the drawbacks of the prior art have been overcome to the extent that a molded, one-piece, easily installed, self-retaining fastener for receiving a mounting member from one side of an apertured panel and for sealing said aperture from the other side of the panel is provided. The above is accomplished by providing a molded fastener having an axially extending shank for insertion through and self-retention in an apertured panel. The shank has a plurality of radially outwardly extending protuberances on one end for insertion into the panel aperture and a semi-spherical, dished head on its other end, said dished head having its concave side towards the protuberances. The end of the shank having the protuberances thereon has at least two axially extending intersecting slots therein to allow resilient radial compression of the shank for passage of the protuberances through the panel aperture. The intersection of the slots also defines an axially extending bore for receiving externally threaded members, such as screws, by which a mounting member such as a bracket may be retained to the panel. The screws retained are preferably self-threadingly retained from the side of the panel opposite that side from which the fastener is inserted. The semi-spherical, dished head is resiliently deformable and its outer periphery and the protuberances are designed to engage opposite sides of an aperture panel therebetween to sealingly and self-retainingly mount the fastener to the panel. The outer periphery and the protuberances are axially separated by a distance less than the thickness of the apertured panel and thus the outer periphery of the concave head will tightly engage the surface of the panel around the aperture and seal one side of the panel from the other. A sealed cap aligned with the shank may extend through the head to provide an extended sealed compartment for receipt of the screw and the head may have a plurality of axially extending ribs or wings to ease handling thereof and also to provide rotational anchoring of the fastener should an insulation medium, such as foamed insulators, be used on the side of the panel from which the fastener is inserted.

The protuberances and slots may also provide means to receive an extension member or spacer such as an axially extending hollow tube. In such a case, the hollow, tubular extension member will preferably be equipped with an enlarged head for surrounding the shank and a plurality of radially and axially extending fins to be resiliently received by the slots. Said enlarged head and/or said fins being received in an interference fit.

Accordingly, it is an object of the present invention to provide an improved, one-piece, molded fastener for sealing, self-retention in an apertured panel.

Another object of the present invention is to provide an improved, easily produced, easily installed, one-piece, self-retaining molded fastener to seal the apertured panel of an insulated appliance and to receive a fastening device such as an externally threaded member or the like.

These and the other objects and advantages of the present invention will become apparent from a reading of the following detailed description of the preferred embodiment taken in connection with the attached drawings.

BRIEF DESCRIPTION OF THE DRAWINGS

FIG. 1 is a top view of the fastener of the present invention.

FIG. 2 is a side view of the fastener of the present invention.

FIG. 3 is a bottom view of the fastener of the present invention.

FIG. 4 is a cross-sectional view of the fastener of the present invention taken along line 4—4 in FIG. 3.

FIG. 5 is a view of an apertured panel for receipt of the fastener of the present invention.

FIG. 6 is a cross-sectional view of the fastener of the present invention as self-retainingly mounted in the apertured panel of FIG. 5.

FIG. 7 illustrates the fastener of the present invention as installed in an apertured panel and as receiving a bracket mounting screw or the like.

DESCRIPTION OF THE PREFERRED EMBODIMENT

Figure 9:
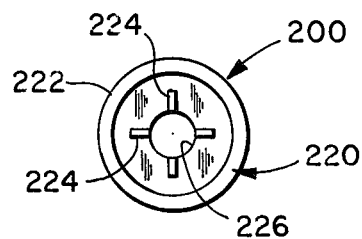
FIG. 9 is a top view of the tubular extension member illustrated in FIG. 8.

The one-piece, molded, self-retaining fastener 10 of the present invention may be seen by reference to FIGS. 1-4. Briefly, the fastener 10 is comprised of an axially extending shank portion 20 and a dished, semi-spherical head portion 40.

The axially extending shank portion 20 has one end thereof attached to the concave surface of the dished head portion 40 and the opposite end 22 thereof designed for insertion through and self-retention in the opening or aperture A, of an apertured panel P. Preferably the cross-sectional shape of the shank portion 20 will generally conform with the cross-sectional shape of the panel aperture A and will have at least one common, cooperating irregularity, such as a flat side, to rotationally fix the shank 20 to the aperture A when the shank is received therein. A plurality of radially outwardly extending protuberances 24 are provided on the outer periphery of the shank portion adjacent the end 22 thereof. The protuberances 24 are designed to engage the side of the apertured panel P opposite the side from which the shank is inserted as may be seen by in FIG. 6. The radially outermost edges 26 of protuberances 24, in an undeformed position, are separated by a distance greater than the corresponding dimension of the aperture A for purposes of self-retainingly mounting the fastener 10 to the apertured panel P. The protuberances 24 have a radially outer, outwardly inclined, lead angle surface 25 which will ease insertion of shank end 22 into the aperture A. The lead angle surface 25 will also cause the protuberances 24 and shank adjacent thereto to fold inwardly upon pressurized contact with a surface moving axially towards the head portion 40 allowing mounting of a member substantially flush with panel P as will be discussed below. The inner surface 27 of the shank axially coincident with the protuberances may be inclined radially outwardly also to facilitate the inward folding of the shank adjacent end 22. A plurality of radially and axially extending, intersecting slots 28 are provided in the end 22 of the shank portion 20. The slots 28 preferably intersect at the axis of the shank. In the embodiment shown in FIG. 3, the shank 20 is of a generally square cross-sectional shape and the slots 28 are along the diagonals of the generally square cross section with the intersection 30 of the slots 28 lying along the axis of the shank.

The intersecting slots 28 allow the shank 20 and the protuberances 24 to be resiliently, inwardly deformed for passage through the panel aperture A as is well known in the art. The axially extending intersection 30 of the slots 28 provides an axially extending cavity for receipt of a fastening member from the side of the apertured panel opposite the side from which the fastener 10 is inserted. Preferably an externally threaded fastening member, such as a screw, is self-threadingly received in the cavity. It is noted that upon receipt of a fastening member in cavity 30, the shank will be considerably less resiliently compressible and thus the fastener 10 will be firmly self-retained in the apertured panel.

The semi-spherical, head portion 40 of fastener 10 is joined to the shank portion 20 at its generally concave surface 48 with the concave surface towards the end of the shank 22 designed for insertion into the apertured panel. The outer, substantially convex surface 50 of the dished head 40 is continuous for purposes of sealing aperture A as will be discussed below. The outer radial periphery 42 of the dished head 40 defines a plane which is substantially normal to the axis of the shank portion 20 and which is separated from the protuberances 24 by an axial distance less than the thickness of the apertured panels P into which fastener 10 is intended for insertion. Upon insertion of the shank end 22 into aperture A, protuberances 24 will be resiliently radially compressed to pass through the aperture and will then expand to an undeformed position on the opposite side of the apertured panel. The outer periphery 42 will engage the surface of panel P from which the fastener 10 is inserted and will be resiliently, outwardly deformed to tightly, and sealingly engage the surface around the aperture and thus seal the aperture. It may be seen by reference to FIG. 6 that fastener 10 provides a means for receiving a threaded member from the side of a panel opposite the side from which the fastener is inserted while also sealing the aperture A should it be desirable not to mount a member to panel P. This feature is important as it allows apertures to be formed in panels for possible receipt of an optional or non-standard device such as an optional ice cube maker in a home freezer.

The continuous outer surface 50 may include a cap 44 which defines an axial extension 52 of the intersection 30 for receiving threaded fasteners. A pair of ribs or wings 46 may be provided to ease handling of the fastener 10 and for anchoring the fastener against rotation when used with foamed insulation or the like as may be seen by reference to FIG. 7. The wings 46 are not in contact with the outer surface of cap 44 defining a pair of spaces 45 therebetween which allow the dished head 40 to be resiliently flexible for sealing engagement of panel P. The top 48 of cap 44 is preferably of thinner wall thickness than the side walls, or film like, allowing the top to expand for receipt of a longer than intended threaded member. The thinner wall thickness of top 48 will also allow for bursting thereof without destruction of the remainder of fastener 10 should it be necessary to utilize fastener 10 with a substantially longer than intended externally threaded member.

In FIG. 7, the fastener 10 is illustrated as self-retainingly sealing mounted to an apertured inner liner 100 of an insulated appliance 103 such as a freezer, or a refrigerator, or the like. A cavity 104 is defined between inner liner 102 and the outer wall 106, the cavity 104 being filled with a foamed insulator. The fastener 10 receives an externally threaded member for mounting a shelf bracket 112 to the inner liner. The interior 114 of the appliance 102 is sealed by means of the head 40 of the fastener 10 which seals the aperture in the inner liner 100 through which the fastener is inserted. It is noted that as shelf bracket 112 is moved axially towards the panel or inner liner 100 as a result of the externally threaded member, or screw, being threaded into fastener 10, the protuberances 24 are engaged under pressure on the lead angle surface 25 and will cause the protuberances 24 and adjacent shank to collapse or fold inwardly into the aperture allowing the shelf bracket 112 to be mounted substantially flush to the inner liner 100.

Figure 8:
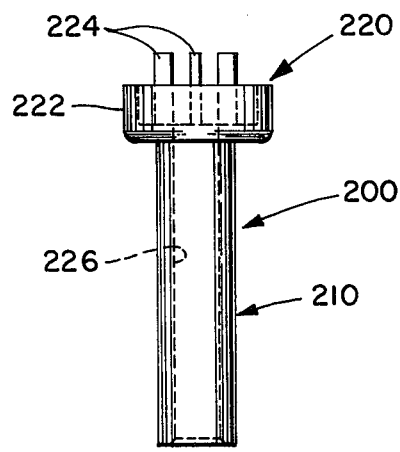
FIG. 8 is an elevated view of a tubular extension member for use with the fastener of the present invention.
Figure 10:
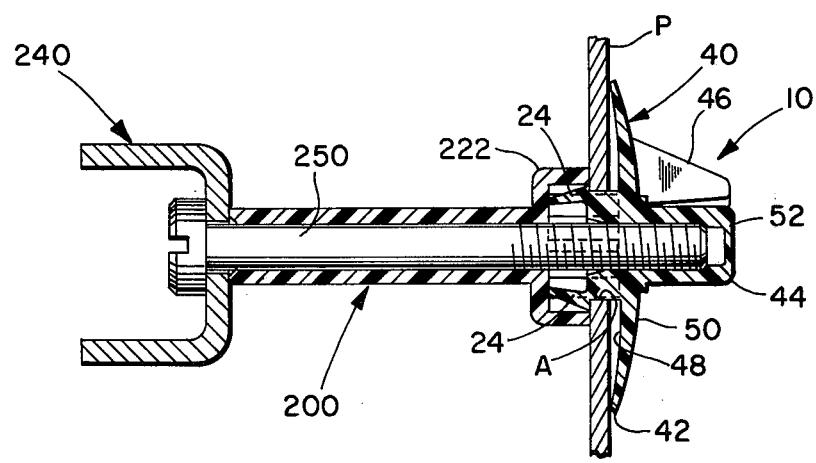
FIG. 10 is a cross-sectional view of the fastener and tubular extension member as utilized to mount a member in spaced relation to an apertured panel.

An extension member or spacer 200 for use with the fastener 10 of the present invention is illustrated in FIGS. 8 and 9. The extension member 200 comprises an elongated, hollow, tubular section 210 for axial alignment with intersection 30 and a hollow coupling member 220. The coupling member 220 has a outer, flanged portion 222 for surrounding the protuberances 24 and a plurality of radially and axially extending ribs 224 designed to be received within the slots 28. The flanged portion 222 and/or the slots 28 respectively in interference fit therewith. A cavity 226 runs the axial length of member 200 and is designed to align with intesection 30 and extension 52 when the ribs 224 are received in slots 28. Use of the extension member or spacer 200 may be seen by reference to FIG. 10 wherein a member 240 is mounted in spaced relation to panel P by means of the spacer 200, fastener 10 and externally threaded member 250 which is self-threadingly retained in fastener 10.

Although this invention has been described in its preferred form with a certain degree of particularity, it is understood that the present disclosure of the preferred form has been made only by way of example and that numerous changes in the details of construction and combination and arrangement of the parts may be resorted to without departing from the spirit and the scope of the invention as hereinafter claimed.

I claim:

1. A one-piece, molded fastener for sealing, self-retention in an apertured panel, said fastener comprising:

an axially extending shank having a cross-sectional shape closely conforming to the cross-sectional shape of said panel apertures, one end of said shank having a plurality of radially outwardly extending protuberances thereon, said one end of said shank having a plurality of radially and axially extending slots therein, the intersection of said slots being generally coaxial with the axis of said shank and defining an axially extending, fastener receiving cavity, said protuberances having an inclined, radially outer surface, said radially outer surface being radially inwardly inclined toward said one end, the inner surfaces of said shank axially coincident with said protuberances being radially outwardly inclined away from said one end, said radially outer surfaces and said inner surfaces meeting substantially at said one end whereby a member making axial sufficiently pressurized contact with said one end will cause said shank adjacent said one end to fold radially inwardly; and a semi-spherical, dished head attached to the other end of said shank, said head attached with its concave surface facing said one end of said shank, said dished head having a continuous, radially outer periphery defining a plane substantially normal to the axis of said shank, said defined plane being spaced from said protuberances by an axial distance less than the thickness of said aperture panel, said dished head having a continuous substantially convex surface opposite its concave surface.

2. The fastener of claim 1 wherein said convex surface has a cap-like projection extending in a direction opposite the shank, said cap-like projection defining a cavity sealed from said convex surface coaxial with the fastener receiving cavity defined by the intersection of said slots.

3. The fastener of claim 2 wherein the wall of said cap-like projection axially aligned with said fastener receiving cavity is comprised of a thin, film like material.

4. The fastener of claim 2 wherein at least one rib like projection extends from said convex surface of said dished head.

5. The fastener of claim 4 wherein said panel aperture is substantially rectangular in cross section, said shank is substantially rectangular in cross section and said slots lie along the diagonals of said cross-sectionally rectangular shank.

6. A two piece fastener for mounting a member in spaced relation to an apertured panel and for sealing one side of said panel from the other, said fastener comprising:

a molded, one-piece, first portion for self-retention in an apertured panel and for receiving an externally threaded member from the side of the panel opposite the side from which the fastener is inserted while sealing the panel aperture from the side of the panel from which the first member is inserted, said first portion comprising:

an axially extending shank having a cross section closely corresponding to the cross section of said aperture, said shank having a plurality of radially outwardly extending protuberances on one end thereof, said one end designed for insertion into the aperture, said protuberances having a radially outer surface inclined radially inwardly toward said one end, said one end of said shank having a plurality of radially and axially extending slots therein, the intersection of said slots being generally coaxial with the axis of said shank and defining an axially extending fastener receiving cavity in said shank, said protuberances designed to engage the side of the panel opposite the side from which the shank is inserted into the aperture; the inner surfaces of said shank axially coincident with said protuberances being radially outwardly inclined away from said one end, said radially outer surfaces and said inner surfaces substantially meeting at said one end; and a semi-spherical, dished head attached to the other end of said shank, said dished head attached with its concave surface facing said one end of said shank, said dished head having a continuous radially outer periphery defining a plane substantially normal to the axis of said shank, said defined plane being spaced from said protuberances by an axial distance less than the thickness of said apertured panel, said dished head having a continuous, substantially convex surface opposite its concave surface, said continuous surface having a cap-like projection extending axially in a direction opposite the shank, said cap-like projection defining a second cavity coaxial with said fastener receiving cavity, said cap-like projection having a thin, film-like wall axially aligned with said fastener receiving cavity; and a molded second portion, said second portion comprising a substantially tubular body having an axially extending passage therethrough, one end of said tubular body having a plurality of radially and axially extending fins for interference fit into said slots and a flange for engaging the outer surface of said protuberances to mount said second portion to said first portion on the side of said panel opposite the side from which the shank is inserted with said passage aligned with said fastener receiving cavity.

7. The fastener of claim 6 wherein said panel aperture is substantially rectangular in cross section, said shank is substantially rectangular in cross section and said slots lie along the diagonals of said cross-sectionally rectangular shank.

* * * * *